United States Patent [19]

Koleske et al.

[11] 4,158,652

[45] Jun. 19, 1979

[54] HIGH SOLIDS COMPOSITIONS CONTAINING ESTER DIOL ALKOXYLATES

[75] Inventors: Joseph V. Koleske, Charleston; Robert J. Knopf, Saint Albans; Oliver W. Smith, South Charleston, all of W. Va.

[73] Assignee: Union Carbide Corporation, New York, N.Y.

[21] Appl. No.: 837,731

[22] Filed: Sep. 29, 1977

[51] Int. Cl.$^2$ ............ C08L 61/24; C08L 61/28; C08L 75/08

[52] U.S. Cl. ............ 260/29.4 UA; 260/849; 260/850; 260/851; 260/856; 526/16; 526/54; 526/56; 528/66; 528/249; 528/250; 528/254; 528/261; 528/273; 528/363; 528/366; 528/422; 528/423

[58] Field of Search ............ 260/67.6 R, 850, 849, 260/29.4 R, 29.4 UA, 856; 528/249, 250, 254, 261

[56] References Cited

U.S. PATENT DOCUMENTS

| | | | |
|---|---|---|---|
| 3,267,174 | 8/1966 | Fry et al. | 260/851 |
| 3,959,201 | 5/1976 | Chang | 260/850 |

*Primary Examiner*—John C. Bleutge
*Attorney, Agent, or Firm*—Francis M. Fazio

[57] ABSTRACT

Compositions comprising an ester diol alkoxylate in conjunction with crosslinkers, or polycaprolactone polyols or derivatives thereof, or low molecular weight polyols, or isocyanates, or latexes have been produced that are useful as coatings, inks and adhesives.

15 Claims, No Drawings

HIGH SOLIDS COMPOSITIONS CONTAINING ESTER DIOL ALKOXYLATES

BACKGROUND OF THE INVENTION

Governmental regulations have placed ever increasing restrictions on the amounts and types of organic volatiles permitted to escape into the atmosphere from coating ink or adhesive compositions. Considerable efforts have been expended to develop such compositions having a minimal amount of volatile organic components and this has led to development of powder compositions, radiation curable compositions, water borne compositions and high solids compositions. In these recent developments the amounts of organic solvents present are minimal and consequently there is little or no atmospheric pollution.

In the field of solvent coatings, efforts have been made to reduce the amount of volatile solvent present and to increase the amount of component that will remain as the coating on the substrate. At a sufficiently high concentration of such components one has what is known as either a high solids or a 100 percent solids coating composition. These are compositions that are applied in liquid form and dry to acceptable films without the evaporation of any substantial amount of solvent. Thus, the compositions hereinafter described, which would serve to lower atmospheric pollution and still produce a good satisfactory coating composition, would be of great importance.

SUMMARY OF THE INVENTION

It has now been found that ester diol alkoxylate can be used in conjunction with methylolated melamines, or polycaprolactone polyols or derivatives thereof, or low molecular weight polyols, or isocyantes, or latexes, or mixtures thereof to produce compositions that have use as coatings, inks or adhesives. The compositions produced additionally contain a solvent or catalyst whenever considered necessary or desired.

DESCRIPTION OF THE INVENTION

The ester diol alkoxylates used to produce the compositions of this invention belong to a new class of materials just recently discovered and are the subject matter of a different application. These ester diol alkoxylates are produced by the reaction of an ester diol of the structural formula:

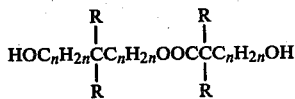 I.

with an oxirane compound, preferably an alkylene oxide, to produce the ester diol alkoxylate of the structural formula:

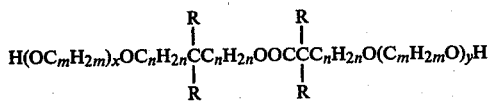 II.

wherein m is an interger having a value of from 2 to 4, preferable 2 or 3; n is an integer having a value of from 1 to 5, preferably 1 to 3 and most preferably 1; x and y are integer each having a value of from 1 to 20 preferably 1 to 10; R is an unsubstituted or substituted, linear or branched alkyl group having from 1 to 8 carbon atoms, preferably 1 to 3 carbon atoms. The substituents on the R group can be any inert group that will not interfere with the reactions involved and can be, for example, cyano, halogen, alkoxyl, nitro, tertiary amine, sulfo, etc. In the formulas, the variables R, m, n, x and y can be the same or different at the various locations.

The novel ester diol alkoxylates (II) are preferably produced by the catalytic reaction of an ester diol (I) with an alkylene oxide or mixtures of alkylene oxides at an elevated temperature as more fully discussed below. One can manufacture the mono, mixed, blocked or capped adducts.

The alkylene oxides suitable for use in the production of the ester diol alkoxylates are the oxirane compounds such as styrene oxide, ethylene oxide, 1,2-propylene oxide, 1,3-propylene oxide, 1,2-butylene oxide, 1,3-butylene oxide and 1,4-butylene oxide as well as similar higher aliphatic monoepoxides.

The ester diols of formula I include 2,2-dimethyl-3-hydroxypropyl 2,2-dimethyl-3-hydroxypropionate; 2,2-dimethyl-4-hydroxybutyl 2,2-dimethyl-3-hydroxypropionate; 2,2-dimethyl-4-hydroxybutyl 2,2-dimethyl-4-hydroxybuty rate; 2,2-dipropyl-3-hydroxypropyl 2,2-dipropyl-3-hydroxypropionate; 2-ethyl-2 butyl-3-hydroxypropyl 2-ethyl-2-butyl-3-hydroxypropionate; 2-ethyl-2-methyl-3-hydroxypopyl 2-ethyl-2-methyl-3-hydroxypropionate; and the like.

During the reaction of the ester diol I with the alkylene oxide a catalyst is preferably used in a catalytically effective amount. The amount of catalyst is from 0.01 to 5 weight percent, preferably from 0.05 to 0.5 weight percent, based on the combined weights of ester diol I and alkylene oxide. The catalysts useful are known to those skilled in the art of alkylene oxide addition chemistry and require little further discussion here. Illustrative thereof one can mention boron trifluoride etherate, potassium, potassium hydroxide, sodium, sodium hydroxide, Lewis acids, sodium ethoxide, mineral acids, and the like.

The reaction of the ester diol with the alkylene oxide is carried out at a temperature of from 20° to 150° C., preferably from 50° to 120° C. for a period of time sufficient to complete the reaction between the reactants charged. The temperature is often dependent upon the particular catalyst selected and the alkylene oxide employed. The time will vary depending upon the size of the batch and the particular reactants and catalysts, and the reaction conditions employed.

The reaction can be conducted at subatmospheric, atmospheric or superatmospheric pressure. The pressure is not critical and sufficient pressure is generally used to retain the reactants in the reactor in liquid form.

The amount of alkylene oxide charged to the reaction is from about 2 moles to about 40 moles, or more, per mole of ester diol charged; preferably from 2 to 20 moles.

To minimize oxidative side reactions the reaction is preferably carried out under an inert gas atmosphere using nitrogen, argon or other inert gas.

If desired an inert solvent such as toluene, benzene or 1,1,1-trichloroethane can be employed. However, the reaction proceeds well in the absence of any such solvent. In most instances a solvent is not required as the ester diol is itself a liquid at the elevated temperatures employed and serves to maintain a liquid reaction system.

At the conclusion of the reaction the product, consisting of a mixture of the novel ester diol alkoxylates, is recovered as a residue product and can be used as such; distillation procedures can also be used to recover more refined products.

In a typical embodiment, the ester diol and catalyst are charged to the reactor and the alkylene oxide is then added over a period of time while maintaining the desired temperature and pressure. At the completion of the addition the contents of the reactor are maintained at the selected conditions until substantially all of the alkylene oxide has reacted. The product can then be purified, if desired, and recovered by conventional procedures. In some instances one may obtain a product containing other glycols as by-products. This can be minimized by proper selection of reaction conditions and catalyst.

The polycaprolactone derivatives that are blended with the ester diol alkoxylates to produce the compositions of this invention are as hereinafter identified. A first group comprises the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The method for producing the polycaprolactone polyols is of no consequence and the organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, and similar polyalkylene glycols, either blocked, capped or heteric, containing up to about 40 or more alkyleneoxy units in the molecule, 3-methyl-1-5-pentanediol, cyclohexanediol, 4,4'-methylene-bis-cyclohexanol, 4,4'-isopropylidene biscyclohexanol, xylenediol, 2-(4 hydroxymethylphenyl) ethanol, 1,4 butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

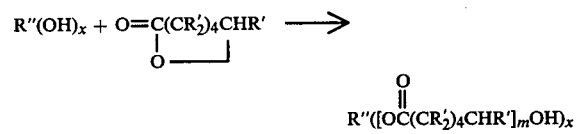

In this equation the organic functional initiator is the R''—(OH)$_x$ compound and the caprolactone is the

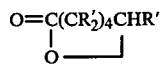

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to 1,000. The most preferred are the polycaprolactone diol compounds having an average molecular weight of from about 290 to about 500 and the polycaprolactone triol compounds having an average molecular weight of from about 300 to about 1,000; these are most preferred because of their low viscosity properties. In the formula m is an integer representing the average number of repeating units needed to produce the compound having said molecular weights. The hydroxyl number of the polycaprolactone polyol can be from about 15 to 600, preferably from 200 to 500; and the polycaprolactone can have an average of from 2 to 6, preferably 2 to 4, hydroxyl groups.

Illustrative of this first group of polycaprolactone polyols that can be used as in the compositions of this invention, and in the preparation of the second group of polycaprolactone derivatives that can be used in the compositions of this invention, one can mention the reaction products of a polyhydroxyl compound having an average from 2 to 6 hydroxyl groups with caprolactone. The manner in which polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

| | POLYCAPROLACTONE POLYOLS | | |
|---|---|---|---|
| | Initiator | Average MW of polyol | Average No. of CPL units in molecules |
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalene glycol | 801 | 5.5 |
| 7 | Diethylene glycol | 527 | 3.7 |
| 8 | Diethylene glycol | 847 | 6.5 |
| 9 | Diethylene glycol | 1,.246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,398 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 835 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4. |
| 28 | 1,2,6-Hexanetriol | 476 | 3 |

-continued

POLYCAPROLACTONE POLYOLS

| | Initiator | Average MW of polyol | Average No. of CPL units in molecules |
|---|---|---|---|
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

*Average molecular weight of glycol.

The structures of the compounds in the above tabulation are obvious to one skilled in the art based on the information given. The structure of compound No. 7 is:

wherein the variable r is an integer, the sum of r+r has an average value of 3.7 and the average molecular weight is 527. The structure of compound No. 20 is:

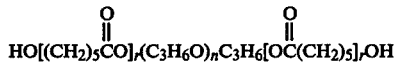

wherein the sum of r+r has an average value of 6 and the average molecular weight is 1,684. This explanation makes explicit the structural formulas of compounds 1 to 34 set forth above.

As previously indicated, the polycaprolactone polyols discussed above are used as intermediates in the production of a second group of polycaprolactone derivatives. In producing this latter type, the polycaprolactone polyol is reacted with a polycarboxylic acid anhydride to product a carboxyl modified adduct. Illustrative thereof one can mention trimellitic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

For the preparation of the carboxyl modified polycaprolactone adducts the amount of polycarboxylic acid anhydride reacted with the polycaprolactone polyol can be an amount sufficient to permit reaction with all of the hydroxyl groups; however, it is preferred to use an amount which is insufficient to react with all of the hydroxyl groups present in the polycaprolactone polyol. This amount will vary and can be from 0.1 to 1 anhydride equivalent for each hydroxyl equivalent or group present in the polycaprolactone polyol initially charged to the reaction mixture and is preferably from 0.1 to 0.4. In a most preferred instance, one anhydride equivalent or anhydride moiety is charged for each nine hydroxyl equivalents or groups initially present in the reaction mixture.

The polycaprolactone polyols are reacted with the polycarboxylic acid anhydride at a temperature of about 75° to 200° C., preferably about 100° to 160° C. The time required for reaction will vary depending upon the particular reactants charged, the temperature and the batch size of the reaction mixture, facts which are well known to those skilled in the art. Generally it has been found that a reaction period in the laboratory of from 15 to 45 minutes at from about 125° to 175° C. is adequate to produce the initial water insoluble carboxyl modified oligomer addition reaction product obtained by the reaction of these two intermediates.

The water insoluble adduct formed at this stage of the reaction is a viscous liquid in most instances. However, in some instances it has been observed that the product will solidify upon standing at room temperature for an extended period of time. This, however, does not detract from its further utility. Generally these modified oligomers or adducts are water insoluble but solvent soluble.

While applicants have not fully established the structures of the carboxyl modified adducts, it has been theorized that the reactions can proceed along the following route:

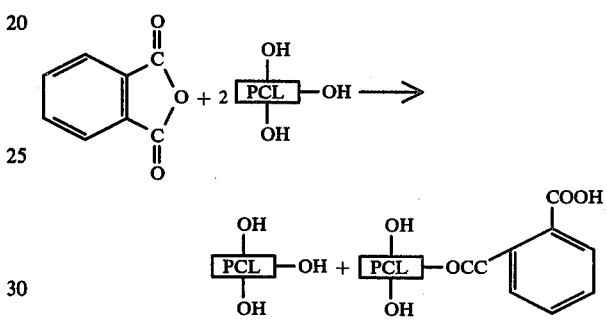

In the above reaction schemes the unit

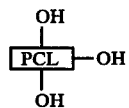

represents a polycaprolactone triol, and phthallic anhydride was used to exemplify the use of an intramolecular anhydride. While this theoretical explanation is presented, applicants do not intend to be bound by any theory.

In a typical reaction for the production of the carboxyl modified adducts one normally charges a polycaprolactone polyol and the polycarboxylic acid anhydride to a reaction vessel and heats the mixture to a temperature of from about 125° to 175° C. for a period of about 20 to 30 minutes. This produces a water insoluble carboxyl modified polycaprolactone oligomer or adduct.

In the schematics shown above specific ratios and compounds were employed for illustrative purposes only. It is apparent, in view of our description, that these can be modified within the ranges disclosed in this application. The carboxyl modified water insoluble adducts shown above can be neutralized with an inorganic or organic base to a pH of from about 7 yo 9 to yield water soluble adducts. The preferred bases are the organic amines such as butylamine, morpholine, triethylamine, diethylamine, or any other known amine with the preferred being the tertiary amines.

The low molecular weight polyols useful in producing the composition of this invention are the nonvolatile low molecular weight polyols containing from 2 to 6, preferably 2 to 4 hydroxyl groups. These nonvolatile low molecular weight polyols can have a molecular weight of from 62 to about 1,000. They can be aliphatic, cycloaliphatic or aromatic in nature. Illustrative thereof one can mention ethylene glycol, diethylene glycol, triethylene glycol, propylene glycol, dipropylene glycol, neopentyl glycol, butylene glycol, 2,2-dimethyl-3-hydroxypropyl 2,2-dimethyl-3-hydroxypropionate, 2,3-dibromo-1,4-but-2-ene diol, bisphenol-A and the ethylene oxide and/or propylene oxide adducts thereof, 2,2-dihydroxymethylpropionic acid, trimethylol ethane, trimethylol propane, pentaerythritol, dipentaerythritol, glycerine, sorbitol, hydrogenated bisphenol-A; 1,1-dihydroxy methane cyclohexane, 2,2'-dihydroxymethylbicyclo [2.2.1]heptane, 1,5-pentane diol, decane diol, and the like. Many other non-volatile low molecular weight diols having a molecular weight of from 62 to about 1,000 are known and can be used; the above enumeration is illustrative only.

The polyisocyanates that can be used in this invention to produce the novel compositons are well known to those skilled in the art and should not require detailed description herein. Any of the polyisocyanates can be used alone or in admixture with other isocyanates including the monoisocyanates. Illustrative of suitable isocyanates one can mention methyl isocyanate, ethyl isocyanate, chloroethyl isocyanate, chloropropyl isocyanate, chlorohexyl isocyanate, chlorobutoxypropyl isocyanate, hexyl isocyanate, phenyl isocyanate, the o-, m- and p-chlorophenyl isocyanates, benzyl isocyanate, naphthyl isocyanate, o-ethylphenyl isocyanate, the dichlorophenyl isocyanates methyl isocyanate, butyl isocyanate, n-propyl isocyanate, octadecyl isocyanate, 3,5,5-trimethyl-1-isocyanato-3-isocyanatomethylcyclohexane, di(2-isocyanatoethyl)-bicyclo(2.2.1)-hept-5-ene-2,3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate, 4,4'-diisocyanato diphenyl ether, 2,4,6-triisocyanate toluene, 4,4',4"-triisocyanateo triphenyl methane, diphenylene-4,4-diisocyanate, the polymethylene polyphenylisocyanates, as well as any of the other organic isocyanates known to the average skilled chemist. The amount of isocyanate used can be an amount sufficient to permit reaction of the isocyanato group with the total number of reactive hydrogen equivalents present.

The latexes that are used in conjunction with the ester diol alkoxylates to produce compositions within the scope of this invention are known to those skilled in the art and include acrylic acid and methacrylic acid derived latexes as well as those latexes derived from their esters. These latexes are commercially available and are known to be copolymers of two or more monomers such as methyl methacrylate, styrene, methyl acrylate, ethyl acrylate, butyl acrylate, 2-ethylhexyl acrylate, butyl methacrylate, methacrylic acid, acrylic acid, 2-hydroxyethyl acrylate, vinyl chloride, vinyl acetate, acrylamide, 2-hydroxypropyl acrylate, isobutoxymethyl acrylamide, maleic acid, glycidyl acrylate, vinylidene chloride, vinyl ethyl ether, butadiene, acrylonitrile, diethyl maleate, vinyl ethyl ketone, and the like. Illustrative of copolymer latexes are vinyl chloride/vinylacetate/methacrylic acid, styrene/ethyl acrylate/methacrylic acid, methyl acrylate/styrene/vinyl acetate/methacrylic acid, and any other known latex.

The amount of ester diol alkoxylate added to the latex can vary from about 5 to about 50 weight percent, based on the total solids content of the latex, preferably from 10 to 20 weight percent. It is added to the latex and stirred in by conventional means to obtain uniform distribution therein. The latex formulation can also contain other components generally present in latex coating compositions, such as, surfactants, antifoams, bactericides, mildewicides, other coalescing aids, freeze-thaw additives, light stabilizers, and the like. These are well known to those skilled in the art, as are the amounts thereof required in latex coatings, and do not need extensive description or discussion herein to enable one skilled in the art to understand their use.

The latex coating compositions containing the ester diol alkoxylates as a coalescing agent are applied to a substrate by the known conventional methods. They are cured by heating at a temperature of about 125° to 250° C., preferably from 150° to 200° C. for a period of time sufficient to obtain a dry film. Generally, this time will range from about one to 30 minutes, preferably from 10 to 20 minutes. The components present in a particular latex coating composition used will determine the temperature and time that will be required to obtain an adequate cure.

The compositions of this invention contain a crosslinker such as a methylolated melamine. These compounds are well known and many are available commercially. Among those preferably suitable are those represented by the general formula:

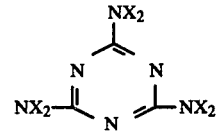

wherein X is hydrogen or —CH$_2$OCH$_3$ and wherein at least two of the X substituents are —CH$_2$OCH$_3$ groups. The preferred melamine derivatives are the highly methylolated melamines, with hexamethoxymethylmelamine most preferred. Other amino resins that can be used include the urea and benzoguanamine resins, the urea formaldehyde aminoplasts, acrylamide resins, as well as any of the other well known crosslinking agents of the amine type.

Catalysts are generally present to catalyze a melamine or amine cure system and these are also well known. Among the common catalysts are the mineral acids such as hydrochloric acid or sulfuric acid, paratoluene sulfonic acid, dodecylbenzene sulfonic acid, phosphoric acid, maleic acid, trimellitic acid, phthalic acid, succinic acid, and the like. Also useful are the half esters of the anhydrides of said acids. It is known that the stronger the acidity, the greater the catalytic activity.

The aminoplast crosslinking agents that are useful in this invention may be either alkylated or unalkylated. It is preferred that they be alkylated when used in coating compositions; but for other uses such as in adhesives or molding compositions; it is preferred that they be unalkylated. The alkylated aminoplast crosslinking agents can be made by reacting an aldehyde, such as formaldehyde, with a urea and then alkylating said urea-formaldehyde reaction product with a low-molecular weight alcohol. Typically, the lower alcohols are those such as methanol, ethanol, propanol, butanol, etc. The ureas useful include urea, ethyl urea, thiourea, and similar compounds. Further, alkylated aminotriazine aldehyde reaction products and guanamines can be used. U.S. Pat. No. 3,197,357 describes a number of these compounds that is incorporated herein by reference to avoid unnecessary redundancy. Illustrative of the aminoplasts is hexakis(methoxymethyl)melamine. Mixed ethers of hexamethylol melamine can also be used and these compounds are described in U.S. Pat. No. 3,471,388 which is also incorporated by reference. Low molecular weight polymers of the above reaction products can also be used. In general, it is preferred that the molecular weight be 1,000 or less.

The concentration of crosslinker, or polycaprolactone or derivatives thereof, or low molecular weight polyol in the composition can vary from 10 to 300 weight percent, preferably from 20 to 100 weight percent, based on the weight of the ester diol alkoxylate present. In those instances in which a polycaprolactone or derivative thereof is used, the concentration thereof can be up to 25 times, or more, based on the weight of ester diol alkoxylate used. This is shown in Example 16 and is principally due to the use of an isocyanate in the composition.

The coatings compositions were evaluated according to the following procedures.

Crosshatch or dry adhesion refers to a test using 10 parallel, single-edge, razor blades to scribe test films with 2 sets of perpendicular lines in a crosshatch pattern. Ratings are based on the amount of film removed after applying and subsequently pulling a contact adhesive tape (Scotch Brand 606) away from the surface of a scribed coating at a 90 degree angle in a fast, rapid movement. It is important to carefully apply and press the tape to the scribed coating to eliminate air bubbles and provide a good bond because adhesion is reported in the percent of film remaining on the substrate with a 100 percent rating indicating complete adhesion of the film to the substrate.

Solvent resistance in a measure of the resistance of the cured film to attack by solvents, usually acetone or methyl ethyl ketone, and is reported in the number of rubs or cycles of solvent soaked cheese cloth required to remove one-half of a film from the test area. The test is performed by stroking the film with an acetone soaked cheese cloth (in this case) until that amount of film coating is removed. The number of cycles required to remove this amount of coating is a measure of the coating solvent resistance.

The pencil hardness, gloss, Taber abrasion, Knoop hardness, Sward hardness and mandrel tests were carried out as described in the A.S.T.M. manual.

Reverse or face impact resistance measures the ability of a given film to resist rupture from a falling weight. A Gardner Impact Tester using an eight-pound dart is used to test the films cast and cured on the steel panel. The dart is raised to a given height in inches and dropped onto the reverse or face side of a coated metal panel. The inches times pounds, designated inch-pounds, absorbed by the film without rupturing is recorded as the reverse or face impact resistance of the film.

In this application, the following definitions apply to particular compounds that are used in the examples. Catalyst 4040 is a catalyst comprising a 40 percent aqueous solution of para-toluene sulfonic acid. Esterdiol-204 is 2,2-dimethyl-3-hydroxypropyl 2,2-dimethyl-3-hydroxypropionate. Irganox 1010 is tetrakis[methylene(3,5-di-tert-butyl-4-hydroxyhydrocinnamate]methane.

Latex A is a 43% solids latex of styrene/ethyl acrylate/methacrylic acid/2-hydroxyethyl acrylate polymer.

Polyol C is a polycaprolactone triol having an average molecular weight of 540 and an average hydroxyl number of 310.

Polyol D is a polycaprolactone triol having an average molecular weight of 300 and an average hydroxyl number of 560.

Polyol E is a polycaprolactone triol having an average molecular weight of 900 and an average hydroxyl number of 187.

Polyol F is the reaction product of a mixture of 2 moles of Polyol D with 1 mole of 3,4-epoxycyclohexane carboxylate; it has an average molecular weight of about 800 and an average hydroxyl number of about 420.

Polyol A is the reaction product of a mixture of a polycaprolactone triol with an average molecular weight of 540 and an average hydroxyl number of 310 and a polycaprolactone triol with an average molecular weight of 300 and an average hydroxyl number of 560 reacted with phthalic anhydride (20 mole percent).

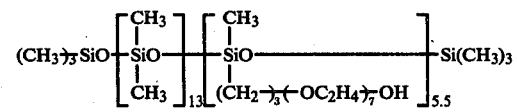

Silicone Surfactant I

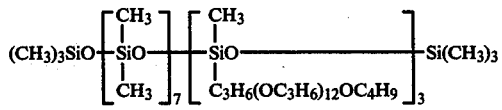

Silicone Surfactant II

Tinuvin 770 ® is a developmental light stabilizer sold by CIBA-GEIGY Corporation and disclosed in U.S. Pat. No. 3,640,928.

The following experiments illustrate the production of the ester diol alkoxylates used in the examples of this invention.

EXPERIMENT A

A reactor was charged with 408 grams of freshly stripped 2,2-dimethyl-3-hydroxypropyl 2,2-dimethyl-3-hydroxypropionate and 1.39 grams of potassium metal as catalyst and heated to liquify the solid. The reactor was purged with nitrogen and then over a 10 hours addition period 528 grams of ethylene oxide were added while maintaining a temperature of from 106° to 114° C. After all of the ethylene oxide had been added, the reaction was continued at 114° C. for 30 minutes to completion. The reaction product was neutralized with 1.69 grams of acetic acid and vacuum stripped at 60° C. and 1 mm of Hg pressure. The liquid ester diol ethoxylate recovered weighed 922 grams as the residue product containing a minor amount of by-products.

The ester diol alkoxylate produced an average of about six (x+y of Formula II) ethyleneoxy units in the molecule. The average molecular weight was 480, the Brookfield viscosity was 194 cps. at 26° C. (No. 3 spindle, 100 rpm.), the specific gravity was 1.079 g/cc and the Gardner color was less than 2. The water dilutability was 250. Water dilutability defines the grams of water than can be added to 100 grams of its ester diol alkoxylate to achieve a haze point.

EXPERIMENT B

Following a procedure similar to that described in Experiment A, 528 grams of ethylene oxide and 612 grams of 2,2-dimethyl-3-hydroxypropyl 2,2-dimethyl-3-hydroxypropionate were reacted using 1 gram of potassium as catalyst. The ethylene oxide feed time was about 9 hours.

The liquid ester diol ethoxylate residue produced weighed 1,128 grams; it has an average of about four ethyleneoxy units in the molecule. The average molecular weight was 392, the Brookfield viscosity was 168 cps, at 27° C. (No. 3 spindle, 100 rpm), the specific gravity was 1.07 g/cc and the Pt/Co color was 40. Water dilutability was 200.

EXPERIMENT C

Following a procedure similar to that described in Experiment A, 792 grams of ethylene oxide and 612 grams of 2,2-dimethyl-3-hydroxypropyl 2,2-dimethyl-3-hydroxypropionate were reacted using 2.1 grams of potassium catalyst. The ethylene oxide feed time was about 11 hours.

The liquid ester diol ethoxylate residue product produced weighed 1,391 grams; it had an average of about six ethyleneoxy units in the molecule. The average molecular weight was 477, the Brookfield viscosity was 200 cps. at 24.5° C. (No. 3 spindle, 100 rpm), the specific gravity was 1.08 g/cc and the Pt/Co color was 60. Water dilutability was 296.

EXPERIMENT D

Following a procedure similar to that described in Experiment A, 220 grams of ethylene oxide and 510 grams of 2,2-dimethyl-3-hydroxypropyl 2,2-dimethyl-3-hydroxypropionate were reacted using 1.1 grams of potassium as catalyst. The ethylene oxide feed time was about 5 hours.

The liquid ester diol ethoxylate residue product produced weighed 730 grams; it had an average of about two ethyleneoxy units in the molecule. The average molecular weight was 295, the Brookfield viscosity was 285 cps at 25° C. (No. 3 spindle, 100 rpm) and the Pt/Co color was 75. Water dilutability was 86.

EXPERIMENT E

Following a procedure similar to that described in Experiment A, 510 grams of 2,2-dimethyl-3-hydroxypropyl 2,2-dimethyl-3-hydroxypropionate and 440 grams of ethylene oxide were reacted for a total of 6.5 hours using 1.425 grams of potassium as catalyst. Then 475 grams of the liquid ester diol ethoxylate product having an average of about four ethyleneoxy units in the molecule were removed from the reaction vessel (hereafter identified as Exp. E: 4 M). It had a Brookfield viscosity at 26° C. of 214 cps after neutralization and stripping.

To the ester diol ethoxylate product remaining in the reactor an additional 110 grams of ethylene oxide were added and reacted in the same manner for another 4 hours. There was recovered, by the procedures described in Experiment A, a liquid ester diol ethoxylate having an average of about 6 ethyleneoxy units in the molecule (hereafter identified as Exp. E: 6M). It had a Brookfield viscosity of 196 cps at 26° C. after neutralization and stripping.

EXPERIMENT F

A glass-lined autoclave was charged with 429.47 parts of 2,2-dimethyl-3-hydroxypropyl 2,2-dimethyl-3-hydroxypropionate and 2.4 parts of boron trifluoride etherate. The mixture was heated to 55° C. and 370.5 parts of ethylene oxide were added over a period of about 13 hours. The mixture was held at this temperature for four more hours. Then, 2 percent by weight of magnesium silicate was added and the contents were heated to 90° C. and stirred for 4 hours. Thereafter the pressure was reduced to 20 mm. Hg and the product was stripped for 4 hours to remove volatiles. Atmospheric pressure was restored with nitrogen, the contents were cooled to 50° C., and transferred to a storage autoclave. Five parts of filter aid were added, the contents were mixed for 30 minutes, and then filtered and stored. A second batch was made in the same manner and both batches were blended by placing the materials in a large autoclave, heating the contents to 90° C. and stripping the product 4 hours at 5 mm. Hg. There was obtained a large quantity of the ester diol ethoxylate having an average of about 4 ethyleneoxy units in the molecule.

EXPERIMENT G

Following a procedure similar to that described in Example 1, 204 grams of 2,2-dimethyl-3-hydroxypropyl 2,2-dimethyl-3-hydroxypropionate and 440 grams of ethylene oxide were reacted at 99° to 115° C. using 1.5 grams of boron trifluoride etherate as the catalyst. The ethylene oxide feed time was about 4.5 hours and the mixture was heated an additional 0.75 hour after completion of the addition. Then 13 grams of magnesium silicate were added and the mixture was stirred overnight at 50° to 65° C. It was filtered, then stripped at 100° C. for one hour to a pressure of 5 mm. Hg.

The liquid ester diol ethoxylate residue product produced weighed 602.4 grams; it had an average of about 10 ethyleneoxy units in the molecule. The Brookfield viscosity was 193 cps at 30° C. (No. 3 spindle, 100 rpm), the specific gravity was 1.046 g/cc and the Gardner color was 1.5. Water dilutability was 15.6.

EXPERIMENT H

In a manner similar to that described in Example 1, 805 grams of 2,2-dimethyl-3-hydroxypropyl 2,2-dimethyl-3-hydroxypropionate and 8 grams of boron trifluoride etherate were melted at 60° C. in a reaction flask. Over a period of about 1.75 hours a total of 811 grams of propylene oxide were added at a temperature of 57° to 60° C. The reaction mixture was stirred about another 2 hours; 32.3 grams of magnesium silicate were added and stirred at about 70° C. for about 1.5 hours. It was then stripped at 70° C. for 0.5 hours at 4–5 mm. or mercury and filtered. The liquid ester diol propoxylate residue product was clear and colorless and weighed 1,508 grams. It had an average of about 4 propyleneoxy units in the molecule.

The following examples serve to illustrate the invention. Parts are by weight unless otherwise indicated.

EXAMPLE 1

A series of aqueous coating compositions was produced by blending the components indicated in the following table. The formulated compositions were applied to steel panels using a No. 60 wire-wound rod and cured at 350° F. for 20 minutes to yield clear, smooth, hard, thermoset films having the properties shown.

| Run | (a) | (b) | (c) | (d) | (e) | (f) |
|---|---|---|---|---|---|---|
| Ester Diol Ethoxylate of Experiment A | 12.0 | 12.0 | 12.0 | 12.0 | 12.0 | 12.0 |
| Hexamethoxy-methylmelamine | 3.5 | 5.0 | 6.5 | 8.0 | 9.5 | 11.0 |
| Water | 4.0 | 4.0 | 4.0 | 4.0 | 4.0 | 4.0 |
| Catalyst TT-5* | 0.4 | 0.4 | 0.4 | 0.4 | 0.4 | 0.4 |
| Total Solids | 80% | 81% | 83% | 84% | 85% | 85% |
| Coating Properties | | | | | | |
| Reverse Impact, in-lbs | 25 | <5 | <5 | <5 | <5 | 15 |
| Acetone Rubs | 25 | 100 | 100 | 100 | 100 | 100 |
| Pencil Hardness | 6B | 6B | 2H | F | HB | 2H |

*Catalyst TT-5 is a blend containing 25% para-toluene sulfonic acid, 25% triethylamine, and 50% isopropanol.

EXAMPLE 2

A series of solvent-free 100 percent solids coating compositions was produced by blending the components indicated in the following table. The formulated compositions were applied and cured as described in Example 1 to yield clear, hard thermoset films having the properties shown.

| Run | (a) | (b) | (c) | (d) | (e) | (f) | (g) |
|---|---|---|---|---|---|---|---|
| Ester Diol Ethoxylate of Experiment A | 12.1 | — | 6.0 | 6.0 | 6.0 | 6.0 | 6.0 |
| Ester Diol Ethoxylate of Experiment B | — | 10.0 | 4.9 | 4.9 | 4.9 | 4.9 | 4.9 |
| Hexamethoxy-methylmelamine | 8.1 | 8.1 | 8.1 | 8.1 | 6.6 | 8.1 | 9.6 |
| Catalyst TT-5 | 0.2 | 0.2 | 0.2 | 0.1 | 0.4 | 0.4 | 0.4 |
| Total Solids | 100% | 100% | 100% | 100% | 100% | 100% | 100% |
| Coating Properties | | | | | | | |
| Reverse Impact, in-lbs. | 5 | 5 | 5 | 25 | 5 | 5 | 5 |
| Acetone Rubs | 100 | 100 | 100 | 100 | 100 | 100 | 100 |
| Pencil Hardness | H | 5H | 2H | HB | 7H | 7H | 7H |

EXAMPLE 3

A series of aqueous coating compositions was produced by blending the components indicated in the following table. All formulations contained 2.0 parts of distilled water. The formulated coatings were applied to steel panels using a No. 40 wire-wound rod and cured at 350° F. for 20 minutes.

| Run | (a) | (b) | (c) | (d) | (e) |
|---|---|---|---|---|---|
| Ester Diol Ethoxylate of Experiment D | 4.0 | 5.0 | 6.0 | 6.0 | 5.0 |
| Hexamethoxymethyl-melamine | 6.0 | 5.0 | 4.0 | 4.0 | 5.0 |
| Para-toluene Sulfonic Acid | 0.1 | 0.1 | 0.1 | — | — |
| Dimethylethanolamine | 0.1 | 0.1 | 0.1 | 0.1 | 0.4 |
| Silicone Surfactant I (drops) | 3 | 3 | 3 | 3 | 3 |
| Maleic Anhydride | — | — | — | — | 0.4 |
| Total Solids | 83% | 83% | 83% | 83% | 81% |
| Coating Properties | | | | | |
| Reverse Impact, in-lbs. | <5 | 5 | 25 | — | 100 |
| Acetone Rubs | 100 | 100 | 100 | — | 100 |
| Pencil Hardness | 5H | 4H | 4H | — | F |
| Appearance, visual | good | good | good | poor | fair |

Thus, hard, thermoset coatings with good visual properties were obtained in Runs (a) to (c). For Run (d) which was the same as Run (c) except that the para-toluene sulfonic acid was omitted, no cure could be effected and poor appearance resulted. When a small amount of maleic anhydride was used as the catalyst in Run (e), cure and good properties resulted; however, visual appearance was only fair since craze lines were apparent throughout the sample.

In a similar manner coating compositions are produced using the ester dial propoxylate of Experiment H.

EXAMPLE 4

A series of aqueous coating compositions was produced by blending the components indicated in the following table together with 1 part of Catalyst 4040, 1 part of Silicone Surfactant I and 2 parts of water and warming to effect solution. The formulations were applied to steel panels and cured for 20 minutes at the indicated temperatures.

| Run | (a) | | (b) | | (c) | |
|---|---|---|---|---|---|---|
| Ester Diol Ethoxylate of Experiment F | 7.5 | | 4.55 | | 11.1 | |
| Esterdiol - 204 | 2.5 | | 4.55 | | — | |
| Hexamethoxymethyl melamine | 10.0 | | 10.9 | | 8.9 | |
| Cure Temperature, °F. | 200 | 250 | 200 | 250 | 200 | 250 |
| Coating Properties | | | | | | |
| Reverse Impact, in-lbs | 75 | <5 | 25 | <5 | 50 | 5 |
| Acetone Rubs | 100 | 100 | 100 | 100 | 100 | 100 |
| Pencil Hardness | 3H | 5H | 2H | 5H | H | 2H |

The results indicate that hard, thermoset coatings were produced.

EXAMPLE 5

A series of compositions was prepared containing a polycaprolactone derivative. The compositions contained the components indicated in the following table; they were applied and cured by the procedures set forth in Example 2.

| Run | (a) | (b) | (c) | (d) | (e) | (f) | (g) |
|---|---|---|---|---|---|---|---|
| Polyol A | 5 | 5 | 5 | 5 | — | — | — |
| Ester Diol Ethoxylate of Experiment A | 10 | 5 | 2.5 | — | 8 | 6 | 4 |
| Polyol D | — | — | — | — | 2 | 4 | 6 |
| Hexamethoxy-methylmelamine | 11.7 | 8.4 | 6.7 | 5 | 8.5 | 10.4 | 12.3 |
| Catalyst TT-5 | — | — | — | — | 0.4 | 0.4 | 0.4 |
| Water | 2.0 | 2.0 | 2.0 | 2.0 | 2.0 | 2.0 | 2.0 |
| Silicone Surfactant I | — | — | — | 2 drops | — | — | — |
| Total Solids | 93% | 90% | 88% | 83% | 90% | 91% | 92% |
| Coating Properties | | | | | | | |
| Reverse Impact, in-lbs | >350 | >350 | >350 | >350 | >5 | >5 | >5 |
| Acetone Rubs | 100 | 100 | 100 | 100 | 100 | 100 | 100 |
| Pencil Hardness | HB | HB | F | 2H | 4H | 7H | 7H |
| ⅛ Inch, Conical Mandrel bend (mm failure) | none | 13 | none | none | complete | complete | complete |
| Gloss | high | → | → | crazed | → | → | |

The results shown that the carboxylic functionality in Polyol A used in Runs (a), (b) and (c) was sufficient to catalyze the cure; they also show that the very reactive TT-5 caused such a rapid reaction that crazing resulted.

In a similar manner compositions are produced using the ester diol ethoxylate of Experiment. G.

EXAMPLE 6

A series of compositions was prepared by blending the components listed below; they were applied and cured by the procedures set forth in Example 2. None of the cured compositions showed any sign of failure by the ⅛ inch conical mandrel bend test.

| Run | (a) | (b) | (c) | (d) | (e) |
|---|---|---|---|---|---|
| Polyol A | 5 | 5 | 5 | 5 | 5 |
| Ester Diol Ethoxylate of Experiment B | 10 | 5 | 2.5 | 5 | 5 |
| Polyol D | — | — | — | 2 | 4 |
| Hexamethoxymethyl-melamine | 11.7 | 8.4 | 6.7 | 10.4 | 12.4 |
| Distilled Water | 2 | 2 | 2 | 2 | 2 |
| Total Solids | 93% | 90% | 88% | 92% | 93% |
| Coating Properties | | | | | |
| Reverse Impact, in-lbs. | >320 | >320 | >320 | 150 | 150 |
| Acetone Rubs | 100 | 100 | 100 | 100 | 100 |
| Pencil Hardness | B | H | H | F | F |

EXAMPLE 7

A series of compositions was prepared by blending the components indicated in the following table with 0.2 part of Catalyst 4040 and 0.05 part of Silicone Surfactant I. They were applied to steel panels using a No. 40 wire-wound rod and cured for 20 minutes at 250° F.

| Run | (a) | (b) | (c) | (d) | (e) | (f) |
|---|---|---|---|---|---|---|
| Ester Diol Ethoxylate of Experiment F | 11.9 | 10.9 | 10.0 | 5.0 | 6.0 | 4.0 |
| Hexamethoxy-methylmelamine | 8.1 | 9.1 | 10.0 | 12.2 | 11.1 | 13.0 |
| Polyol D | — | — | — | 5.0 | 4.0 | 6.0 |
| Ethoxyethyl Acetate | — | — | — | 2.0 | 2.0 | 2.0 |
| Total Solids | 100% | 100% | 100% | 92% | 91% | 92% |
| Coating Properties | | | | | | |
| Reverse Impact, in-lbs | 75 | 50 | 100 | 15 | 25 | 5 |
| Acetone Rubs | 100 | 100 | 100 | 100 | 100 | 100 |
| Pencil Hardness | 2H | 2H | 2H | 4H | 4H | 4H |

The coatings described in Runs (a) to (c) are hard, tough, thermoset coatings. The coatings described in Runs (d) to (f), which contained excess melamine and Polyol D, are hard, thermoset coatings with only fair reverse impact resistance. These results indicate that use of a low-cure temperature (250° F.) compared to a temperature (350° F.) used in some of the examples often results in improved coating performance characteristics.

EXAMPLE 8

A series of compositions was prepared by blending the components indicated in the following table. The formulations were applied to steel panels using a No. 40 wire wound rod and cured for 20 minutes at the three indicated temperatures. In all instances clear, dry, fully cured films were obtained.

| Run | (a) | (b) | (c) | (d) | (e) |
|---|---|---|---|---|---|
| Ester Diol Ethoxylate of Experiment F | 10.9 | 9.0 | 8.0 | 7.0 | 5.0 |
| Polyol D | — | 1.0 | 2.0 | 3.0 | 5.0 |
| Hexamethoxymethyl-melamine | 9.1 | 9.2 | 10.0 | 10.7 | 10.0 |
| Catalyst 4040 | 0.2 | 0.2 | 0.2 | 0.2 | 0.2 |
| Silicone Surfactant I | 0.05 | 0.05 | 0.05 | 0.05 | 0.05 |
| Ethoxyethyl Acetate | 2.0 | 2.0 | 2.0 | 2.0 | 2.0 |

| Run | (a) | | | (b) | | | (c) | | | (d) | | | (e) | | |
|---|---|---|---|---|---|---|---|---|---|---|---|---|---|---|---|
| Coating Properties | | | | | | | | | | | | | | | |
| Cure Temp., °F. | 180 | 220 | 250 | 180 | 220 | 250 | 180 | 220 | 250 | 180 | 220 | 250 | 180 | 220 | 250 |
| Reverse Impact, in lbs. | 100 | 125 | 100 | 100 | 100 | 25 | 100 | 250 | 50 | 320 | 200 | 5 | 150 | 25 | 5 |
| Acetone Rubs | 50 | 100 | 100 | 100 | 100 | 100 | 98 | 100 | 100 | 55 | 100 | 100 | 100 | 100 | 100 |
| Pencil Hardness | HB | 2H | 3H | 2B | 2H | 3H | 3B | H | 3H | 4B | 2H | 4H | 2H | 3H | 3H |

EXAMPLE 9

A series of formulations was prepared in which the concentration of the catalyst only was varied to ascertain the effect of catalyst concentration on the cure temperature. Each formulation contained 8 parts of the ester diol ethoxylate of Experiment F, 2 parts of Polyol D, 10 parts of hexamethoxymethylmelamine, 0.05 part of Silicone Surfactant I and 2 parts of water. The formulations were applied to steel panels and cured for 20 minutes at the indicated temperatures.

| Run | (a) | | | (b) | | |
|---|---|---|---|---|---|---|
| Catalyst 4040, parts | 0.10 | | | 0.20 | | |
| Cure Temperature, °F. | 220 | 210 | 190 | 220 | 210 | 190 |
| Reverse Impact, in-lbs | 125 | 150 | — | 100 | 175 | 175 |
| Acetone Rubs | 100 | 100 | 15 | 100 | 100 | 90 |
| Pencil Hardness | 2H | HB | T* | 2H | H | B |

| Run | (c) | | | | | |
|---|---|---|---|---|---|---|
| Catalyst, 4040, parts | 0.40 | | | | | |
| Cure Temperature, °F. | 220 | 210 | 190 | 170 | 150 | RT** |
| Reverse Impact, in-lbs | 30 | 100 | 100 | 200 | — | No Cure |
| Acetone Rubs | 100 | 100 | 100 | 100 | 7 | |
| Pencil Hardness | 5H | 3H | F | F | T* | |

| Run | (d) | | | | | |
|---|---|---|---|---|---|---|
| Catalyst 4040, parts | 0.80 | | | | | |
| Cure Temperature, °F. | 220 | 210 | 190 | 170 | 150 | RT** |
| Reverse Impact, in-lbs | 15 | 25 | 75 | 275 | 100 | — |
| Acetone Rubs | 100 | 100 | 100 | 100 | 67 | 8 |
| Pencil Hardness | 4H | 4H | 3H | H | B | T* |

| Run | (e) | | | | | | |
|---|---|---|---|---|---|---|---|
| Catalyst 4040, parts | 1.60 | | | | | | |
| Cure Temperature, °F. | 220 | 210 | 190 | 170 | 150 | 120 | RT** |
| Reverse Impact, in-lbs | 5 | 15 | 10 | 250 | 320 | — | — |
| Acetone Rubs | 100 | 100 | 100 | 100 | 100 | 25 | 38 |
| Pencil Hardness | 5H | 5H | 5H | 2H | H | T* | T* |

| Run | (f) | | | | | | |
|---|---|---|---|---|---|---|---|
| Catalyst 4040, parts | 3.20 | | | | | | |
| Cure Temperature, °F. | 220 | 210 | 190 | 170 | 150 | 120 | RT** |
| Reverse Impact, in-lbs | 5 | 10 | 10 | 50 | 150 | 320 | 320 |
| Acetone Rubs | 100 | 100 | 100 | 100 | 100 | 83 | 100 |
| Pencil Hardness | 5H | 5H | 5H | 2H | 2H | 2B | H |

*T = Tacky
**RT = Room Temperature, 24 hours

EXAMPLE 10

A pigmented composition was produced by blending 90 parts of the ester diol ethoxylate of Experiment F, 20 parts of Polyol D, 110 parts of hexamethoxymethylmelamine, 182.5 parts of titanium dioxide, 40 parts of a 50/50 mixture of ethoxyethyl acetate and xylene, and 0.4 part of Silicone Surfactant I. These ingredients were weighed into a ball mill and rolled for about 18 hours. The grind was then filtered. To 200 parts of the filtered grind, 30 parts of a 50/50 mixture ethoxyethyl acetate and xylene and 9.10 parts of Catalyst 4040 were added. After blending, these ingredients the formulation had a Brookfield viscosity of 190 cps.

Steel panels were spray coated using a conventional suction feed spray system and then cured for 20 minutes at 200° F. The cured coatings had the following properties.

| | |
|---|---|
| Reverse Impact | 25 in-lbs. |
| Acetone Rubs | 100 |
| Pencil Hardness | 2H |
| 20° Gloss | 50 |
| Dry Adhesion | 25% |

EXAMPLE 11

A series of compositions was prepared by blending 10 parts of hexamethoxymethylmelamine, 0.1 part of Silicone Surfactant I and 2 parts of ethoxyethyl acetate with the components indicated below. Each formulation was then coated on steel panels using a No. 40 wire-wound rod and cured at the indicated temperatures. In each instance clear, dry films were produced.

| Run | (a) | | (b) | | (c) | |
|---|---|---|---|---|---|---|
| Polyol A, parts | 2.5 | | 5.0 | | 7.5 | |
| Ester Diol Ethoxylate of Experiment F | 7.5 | | 5.0 | | 2.5 | |
| Coating Properties | | | | | | |
| Cure Temperature, °F. | 300 | 350 | 300 | 350 | 300 | 350 |
| Reverse Impact, in-lbs. | >320 | >320 | >320 | >320 | >320 | >320 |
| Acetone Rubs | 55 | 100 | 100 | 100 | 100 | 100 |
| Pencil Hardness | 4B | H | HB | 2H | H | 2H |
| Dry Adhesion, %* | 0 | 0 | 0 | 0 | 0 | 0 |
| Wet Adhesion, %* | 85 | 0 | 0 | 0 | 0 | 2 |

| Run | (a) | | (b) | | (c) | |
|---|---|---|---|---|---|---|
| Wet Pencil Hardness* | <4B | HB | 4B | H | 2B | H |

*The values listed are % removal of coating with Scotch tape from a crosshatched area. The "wet" values were obtained by immersing the panel into a 50° C. water bath for 16 hours.

The examples show that blends of the ester diol ethoxylate and Polyol A have excellent coating characteristics and do not lose their properties when immersed in hot water for extended periods of time.

EXAMPLE 12

A series of compositions was produced by blending 0.1 parts of Silicone Surfactant I and 2 parts of water with the components shown below. In some instances the container was warmed with hot tap-water to aid solution. The formulations were coated on to steel panels with a No. 40 wire wound rod and cured at 250° F. for 20 minutes.

| Run | (a) | (b) | (c) | (d) | (e) | (f) | (g) | (h) | (i) | (j) | (k) | (l) |
|---|---|---|---|---|---|---|---|---|---|---|---|---|
| Ester Diol Ethoxylate of Experiment F | 8.5 | 7.0 | 8.5 | 7.0 | 8.5 | 7.0 | 8.5 | 7.0 | 8.5 | 7.0 | 8.5 | 7.0 |
| Polyol D | 1.5 | 3.0 | 0 | 0 | 0 | 0 | 1.5 | 3.0 | 0 | 0 | 0 | 0 |
| Polyol C | 0 | 0 | 1.5 | 3.0 | 0 | 0 | 0 | 0 | 1.5 | 3.0 | 0 | 0 |
| Polyol E | 0 | 0 | 0 | 0 | 1.5 | 3.0 | 0 | 0 | 0 | 0 | 1.5 | 3.0 |
| Hexamethoxymethyl-melamine | 9.5 | 10.6 | 8.0 | 7.6 | 8.4 | 8.5 | 8.0 | 7.6 | 12.4 | 16.5 | 8.4 | 8.5 |
| Catalyst 4040 | 0.86 | 0.90 | 0.82 | 0.82 | 0.80 | 0.78 | 0.80 | 0.79 | 0.97 | 1.10 | 0.80 | 0.80 |
| Coating Properties | | | | | | | | | | | | |
| Reverse Impact, in-lbs | 5 | 5 | 5 | 5 | 5 | 5 | 5 | 5 | 5 | 5 | 5 | 5 |
| Acetone Rubs | 100 | 100 | 100 | 100 | 100 | 100 | 100 | 100 | 100 | 100 | 100 | 100 |
| Pencil Hardness | 5H | 5H | 5H | 5H | 5H | 4H | 4H | 2H | 5H | 5H | 4H | 3H |
| Wet Pencil Hardness* | — | HB | — | H | — | H | — | 3B | — | 2H | — | HB |
| Solution Characteristics | | | | | | | | | | | | |
| Water Dilutability** | 63 | 46 | 31 | 29 | 23 | 15 | 23 | 21 | 84 | 52 | 43 | 30 |

*Wet pencil hardness is the hardness of the coating after immersion in 50° C. water for 16 hours.
**Water dilutability is the percent water that can be added to the polyol before a hazy solution results.

EXAMPLE 13

A series of compositions was produced by blending 0.5 part of Catalyst 4040, 0.1 part of Silicone Surfactant I and 2 parts of water with components shown below. The formulations were coated onto steel panels and cured for 20 minutes at 200° F.

| Run | (a) | (b) | (c) | (d) | (e) | (f) |
|---|---|---|---|---|---|---|
| Ester Diol Ethoxylate of Experiment F | 10.0 | 9.5 | 9.0 | 8.5 | 8.0 | 7.0 |
| Trimethylolpropane | 0 | 0.5 | 1.0 | 1.5 | 2.0 | 3.0 |
| Hexamethoxymethyl-melamine | 8.3 | 9.7 | 11.0 | 12.4 | 13.8 | 16.5 |
| Coating Properties | | | | | | |
| Reverse Impact, in-lbs | 150 | 75 | 50 | 50 | 25 | 10 |
| Acetone Rubs | 100 | 100 | 100 | 100 | 100 | 100 |
| Pencil Hardness | 2H | 2H | 3H | 3H | 3H | 3H |

EXAMPLE 14

A pigmented composition was prepared from 90 parts of the ester diol ethoxylate described in Experiment F, 10 parts of trimethylolpropane, 110 parts of hexamethoxymethylmelamine, 182.5 parts of titanium dioxide, 1 part of Silicone Surfactant I and 30 parts of water. These components were mixed and charged to a ball mill and rolled for about 18 hours. The grind was then filtered; and, to 262 parts of the grind, 3.09 parts of Catalyst 4040 and 40 parts of water were added. The mixture was well blended. It had a Brookfield viscosity of 200 cps when measured at room temperature.

Steel panels were spray coated using a conventional suction-feed spray system. The panels were cured for 20 minutes at two temperatures. The results were as follows.

| Cure Temperature | 220° F. | 250° F. |
|---|---|---|
| Reverse Impact, in-lbs | 50 | 5 |
| Acetone Rubs | 100 | 100 |
| Pencil Hardness | B | 2H |
| 20° Gloss | 40% | 29% |
| Dry Adhesion | 50% | 50% |

EXAMPLE 15

A series of compositions was produced in which the concentration of the hexamethoxymethylmelamine crosslinker concentration was varied. The formulations were produced by blending 9 parts of the ester diol ethoxylate of Experiment F, one part of trimethylolpropane, 0.1 part of Silicone Surfactant I and 2 parts of water with the crosslinker and catalyst shown below. The formulations were coated on steel panels and cured at 200° F. for 20 minutes. In all instances clear, dry films were obtained having a high gloss.

| Run | (a) | (b) | (c) | (d) | (e) | (f) | (g) | (h) |
|---|---|---|---|---|---|---|---|---|
| Catalyst 4040, parts | 0.70 | 0.75 | 0.80 | 0.69 | 0.78 | 0.88 | 0.97 | 1.06 |
| Hexamethoxymethylmelamine, parts | 4.0 | 5.0 | 6.0 | 7.0 | 9.0 | 11.0 | 13.0 | 15.0 |
| Reverse Impact, in-lbs | — | 25 | 25 | 25 | 50 | 50 | 75 | 25 |
| Acetone Rubs | 58 | 100 | 100 | 100 | 100 | 100 | 100 | 100 |
| Pencil Hardness | — | F | H | 2H | 3H | 3H | 3H | 3H |

EXAMPLE 16

A series of urethane modified compositions was prepared by blending the components set out in the following table. The isocyanate used was the biuret of hexamethylene diisocyanate, as a 75 percent solution in a 1/1 ethylene glycol acetate/xylol mixture. The formulations were coated on to steel panels, air dried for 5 minutes, and then cured at 180° F. for 10 minutes to yield clear, dry films.

| Run | (a) | (b) | (c) | (d) |
|---|---|---|---|---|
| Isocyanate | 75.0 | 37.5 | 37.5 | 37.5 |
| Polyol F | 47.5 | 22.07 | 18.33 | 14.04 |
| Ester Diol Ethoxylate of Experiment F | 0 | 2.45 | 7.85 | 14.04 |
| Silicone Surfactant II | 0.12 | 0.062 | 0.064 | 0.066 |
| Catalyst (DBTDL)* | 0.024 | 0.012 | 0.013 | 0.013 |
| Tinuvin 770 ® | — | 0.186 | 0.191 | 0.197 |
| Irganox 1010 ® | — | 0.062 | 0.064 | 0.066 |
| 1/1 Ethylene Glycol Acetate/Xylol | 25 | 12.5 | 12.5 | 12.5 |
| Ethoxyethyl Acetate | 56 | 20 | 10 | 10 |
| Brookfield Viscosity, cps | 75 | 108 | 186 | 170 |
| Total Solids, % | 60.2 | 65.73 | 73.99 | 74.55 |
| Coating Performance*** | | | | |
| Pencil Hardness | 2H | H | F | H |
| Sward Hardness | 48 | 62 | 46 | 20 |
| Knoop-25 Hardness | 12.2 | 12.5 | 5.91 | — |
| Impact, Face, in.-lbs. | 160 | 125 | >320 | >320 |
| Impact, Reverse, in.-lbs. | 155 | 190 | >320 | >320 |
| Crosshatch Adhesion+ | 100% | 100% | 100% | 100% |
| Taber Abrasion** | 3.17 | 13.0 | 15.9 | 8.2 |
| Run | (e) | (f) | (g) | (h) |
| Isocyanate | 75.0 | 37.5 | 37.5 | 37.5 |
| Polyol F | 57.6 | 26.33 | 21.18 | 15.65 |
| Ester Diol Ethoxylate of Experiment F | 0 | 2.93 | 9.08 | 15.65 |
| Silicon Surfactant II | 0.133 | 0.067 | 0.068 | 0.069 |
| Catalyst (DBTDL)* | 0.026 | 0.013 | 0.014 | 0.014 |
| Tinuvin 770 ® | — | 0.200 | 0.200 | 0.210 |
| Irganox 1010 ® | — | 0.067 | 0.068 | 0.069 |
| 1/1 Ethylene Glycol Acetate/Xylol | 25.0 | 12.5 | 12.5 | 12.5 |
| Ethoxyethyl Acetate | 59.5 | 15.0 | 12.0 | 10.0 |
| Brookfield Viscosity, cps | 72 | 164 | 172 | 164 |
| Total Solids, % | 61.1 | 70.9 | 73.5 | 75.5 |
| Coating Performance*** | | | | |
| Pencil Hardness | 2H | H | H | HB |
| Sward Hardness | 48 | 60 | 26 | 8 |
| Knoop-25 Hardness | 11.0 | 11.1 | 2.73 | — |
| Impact, Face, in.-lbs. | 300 | 190 | >320 | >320 |
| Impact, Reverse, in.-lbs. | 300 | 140 | >320 | >320 |
| Crosshatch Adhesion+ | 100% | 100% | 100% | 100% |
| Taber Abrasion** | 3.57 | 16.8 | 8.1 | 6.7 |

*DBTDL = dibutyltindilaurate
**Mg. loss with 100 cycles, CS-10 wheel, 1000 gm. load.
***All properties were determined after the sample aged 7 days at room temperature
+% is amount remaining after the test is run.

EXAMPLE 17

The ester diol ethoxylate of Experiment F was used as a coalescing aid in acrylic latexes. In the formulations it is not removed during cure or bake and in the presence of a crosslinker reacts and becomes an integral part of the coating. In the following series, Latex A was tested alone, with the monobutylether of ethylene glycol (a conventional coalescing aid) and with the ester diol ethoxylate.

The latex was first made alkaline with dimethylethanolamine to a pH of 8.5. Then, the coalescing aids were added, the mixtures were blended, and the formulations were cast onto steel panels. The films were dried at room temperature for 3 hours and the film quality was visually evaluated. The formulations and results are tabulated below. Runs (f) and (g) show that when more than the required amount for coalescence is used, no incompatibility appears to exist. These are clear, thermoplastic coatings.

| Run | (a) | (b) | (c) | (d) | (e) | (f) | (g) |
|---|---|---|---|---|---|---|---|
| Latex A Solids, parts | 10.0 | 10.0 | 10.0 | 10.0 | 10.0 | 10.0 | 10.0 |
| Latex A Water, parts | 13.3 | 13.3 | 13.3 | 13.3 | 13.3 | 13.3 | 13.3 |
| Monobutylether of Ethylene Glycol | 0 | 0.25 | 0.5 | 0 | 0 | 0 | 0 |
| Ester Diol Ethoxylate of Experiment F | 0 | 0 | 0 | 0.5 | 0.75 | 1.0 | 1.5 |
| % Coalescing Aid* | 0 | 2.4 | 4.8 | 4.8 | 7.0 | 9.1 | 13.0 |
| Evaluation | | | | | | | |
| Color | W** | W | T++ | W | T | T | T |
| Physical Condition | P+ | P | C*** | P | C | C | C |

*% is based on latex solids
**W = White
+P = Powder
++T = Transparent
***C = Continuous, uniform film Thus, when Latex A is filmed alone, it is white and powdery. When the ester diol ethoxylate of Experiment F is used, the latex film is uniform and clear.

EXAMPLE 18

A pigment grind was prepared from 341.4 parts of water, 0.8 part of dimethylethanolamine, 24.8 parts of ethylene glycol, 53.4 parts of a commercial dispersant, 16.4 parts of a commercial wetting aid, 4.0 parts of a commerical defoamer, and 1559.2 parts of titanium dioxide. All ingredients except the titanium dioxide were placed in a container and stirred for five minutes. Then the titanium dioxide was slowly added and the mixture was ground until a temperature of 50° C. was reached. The product is designated as Grind A.

Latex A formulations containing various amounts of the ester diol ethoxylate described in Experiment F were prepared. The formulations contained hexamethoxymethylmelamine as crosslinking agent. The formulations were sprayed onto steel panels with a conventional suction feed spray system. The coated panels were allowed to airdry at room temperature for five minutes. Then, they were cured at 176.7° C. for 20 minutes. The formulations and results are tabulated below.

| Run | (a) | (b) | (c) | (d) | (e) |
|---|---|---|---|---|---|
| Formulation, parts | | | | | |
| Grind A | 60.92 | 67.18 | 77.23 | 87.38 | 97.6 |
| Distilled Water | 39.92 | 39.92 | 39.92 | 39.92 | 39.92 |
| Dimethylethanolamine | 1.4 | 1.4 | 1.4 | 1.4 | 1.4 |
| Latex A Solids | 55.09 | 52.34 | 47.74 | 43.19 | 38.56 |
| Latex A Water | 73.03 | 69.37 | 63.29 | 57.25 | 51.12 |
| Monobutylether of ethylene glycol | 6.75 | 0 | 0 | 0 | 0 |
| Hexamethoxymethylmelamine | 11.25 | 14.45 | 19.79 | 25.08 | 30.46 |
| Ester Diol Ethoxylate of Experiment F | 0 | 6.4 | 17.09 | 27.67 | 38.43 |
| % Coalescing Aid* | 10.9 | 10.9 | 26.4 | 39.0 | 49.9 |
| Coating Properties | | | | | |
| 20° Gloss, % | 33 | 43 | 20 | 26 | 12 |
| 60° Gloss, % | 77 | 87 | 67 | 72 | 52 |
| Pencil Hardness | 3H | 2H | 3H | 3H | 3H |
| Crosshatch Adhesion** | 10 | 9 | 9 | 9 | 8 |
| ⅛" Mandrel Bend** | 10 | 10 | 10 | 10 | 10 |
| Impact, Face, in-lbs. | 160 | 135 | 110 | 130 | 85 |
| Impact, Reverse, in-lbs. | 60 | 115 | 30 | 35 | 15 |

*% is based on latex solids (wt. coalescing aid ÷ wt. latex solids + wt. coalescing aid) (100%)
**These tests are rated on a 1 to 10 basis with 10 indicating no failure.

EXAMPLE 19

A series of pigmented formulations similar to those described in Example 18 were prepared and cured. In this series the Latex A solids and ester diol ethoxylate were kept constant and the amounts of Grind A and crosslinking agent were varied. Clear, dry films were obtained in all instances.

| Run | (a) | (b) | (c) |
|---|---|---|---|
| Formulation, Parts | | | |
| Grind A | 145.46 | 157.58 | 181.82 |
| Distilled Water | 70.0 | 100.0 | 130.0 |
| Dimethylethanolamine | 2.8 | 2.8 | 2.8 |
| Latex A Solids | 93.74 | 93.65 | 93.65 |
| Latex A Water | 124.26 | 124.15 | 124.15 |
| Hexamethoxymethylmelamine | 27.0 | 40.46 | 67.44 |
| Ester Diol Ethoxylate of Experiment F | 38.42 | 38.42 | 38.42 |
| % Coalescing Aid* | 29.1 | 29.1 | 29.1 |
| Coating Properties | | | |
| 20° Gloss | 69 | 68 | 18 |
| 60° Gloss | 95 | 93 | 72 |
| Pencil Hardness | H | 3H | 3H |
| Crosshatch Adhesion** | 10 | 10 | 10 |
| ⅛" Mandrel Bend** | 10 | 10 | 10 |
| Impact, Face, in-lbs. | 190 | 95 | 120 |
| Impact, Reverse, in-lbs. | 175 | 15 | 0 |

*% is based on latex solids (wt. coalescing aid ÷ wt. latex solids + wt. coalescing aid) (100%).
**These tests are rated on a 1 to 10 basis with 10 indicating no failure.

EXAMPLE 20

A set of two aqueous and non-aqueous compositions was produced by blending 10 parts of an ester dialethoxylate having an average of 10 ethyleneoxy units in the molecule (acid number of 1.52 and Brookfield viscosity of 255 cps), 10 parts of hexamethoxymethylmelamine 0.2 parts of Catalyst 4040 and 0.1 part of Silicone Surfactant I with 2 parts of ethoxyethyl acetate (Run A) or 2 parts of water (Run B). Each was applied to steel panels and cured at 250° F. or 350° F. as described in Example 3. All samples cured to dry films having excellent acetone resistance and crosshatch adhesion properties and good face impact and pencil hardness properties.

EXAMPLE 21

A series of compositions was produced by uniformly blending the components set forth below. The compositions were applied to steel panels and cured at temperatures of 200° F., 250° F. and 300° F. for 20 minutes as described in Example 3. All compositions cured to dry films having excellent acetone resistance and crosshatch adhesion and good pencil hardness; impact resistance was good at low temperature cure, higher cure temperatures had an adverse effect on impact resistance properties.

| Run | (a) | (b) |
|---|---|---|
| Ester Diol Propoxylate of of Experiment H | 10 | 10 |
| Hexamethoxymethylmelamine | 6.4 | 7 |
| Catalyst 4040 | 0.3 | 0.3 |
| Butyl Acetate | 4.1 | 4.3 |
| Silicone Surfactant I | 0.1 | 0.1 |

EXAMPLE 22

A uniform composition was produced by blending 10 parts of the ester diol ethoxylate of Experiment F, 10 parts of hexamethoxymethylmelamine and 0.2 part of Catalyst 4040. A 1 mil coating was applied to a 0.5 inch by 1 inch portion at the end of two 1 inch wide by 1.5 inches long strips of steel. The two coated areas were contacted with each other, clamped with a paper clip and cured at 300° F. for 20 minutes. In two replicate experiments, an average of 20 pounds of tensile force was required to break the adhesive bond that had formed. The tensile force was applied by pulling the unadhered ends of the two strips away from each other in a straight line.

What we claim is:

1. A high solids composition comprising a blend of (I) an ester diol alkoxylate of the formula:

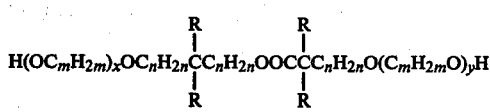

wherein m is an integer having a value of from 2 to 4; n is an integer having a value of from 1 to 5; x and y are integers having a value of from 1 to 20 and R is an unsubstituted or substituted alkyl group having from 1 to 8 carbon atoms and (II) from 10 to 300 weight percent thereof of at least one member selected from the group consisting of:

(A) an aminoplast crosslinker; or
(B) an aminoplast crosslinker and a polycaprolactone polyol having an average molecular weight of from 290 to about 6,000, an average hydroxyl number of from about 15 to 600 and an average of from 2 to 6 hydroxyl groups; or
(C) an aminoplast crosslinker and a carboxyl modified polycaprolactone adduct reaction product mixture of the reaction of (i) a polycaprolactone polyol and (ii) from 0.1 to 1 carboxylic acid anhydride equivalent for each hydroxyl equivalent present in the polycaprolactone polyol of an intramolecular anhydride of a polycarboxylic acid; or
(D) an aminoplast crosslinker and a low molecular weight polyol having a molecular weight of from 62 to about 1,000 and from 2 to 6 hydroxyl groups; or
(E) an aminoplast crosslinker and an aqueous acrylic latex.

2. A composition as claimed in claim 1, wherein Component I is:

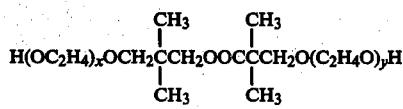

and the average of the sum of x plus y is from 2 to 20.

3. A composition as claimed in claim 1, wherein Component I is:

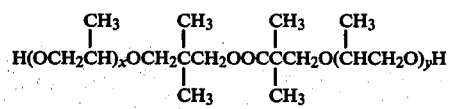

and the average of the sum of x plus y is from 2 to 20.

4. A composition as claimed in claim 1, wherein Component II is an aminoplast crosslinker.

5. A composition as claimed in claim 4, wherein said aminoplast crosslinker is hexamethoxymethylmelamine.

6. A composition as claimed in claim 1, wherein Component II is a mixture of an aminoplast crosslinker and a polycaprolactone polyol.

7. A composition as claimed in claim 6, wherein said aminoplast crosslinker is hexamethoxymethylmelamine and said polyol is a polycaprolactone triol having an average molecular weight of 540 and an average hydroxyl number of 310.

8. A composition as claimed in claim 6, wherein said aminoplast crosslinker is hexamethoxymethylmelamine and said polyol is a polycaprolactone triol having an average molecular weight of 300 and an average hydroxyl number of 560.

9. A composition as claimed in claim 6, wherein said aminoplast crosslinker is hexamethoxymethylmelamine and said polyol is a polycaprolactone triol having an average molecular weight of 900 and an average hydroxyl number of 187.

10. A composition as claimed in claim 1, wherein Component II is a mixture of an aminoplast crosslinker and a carboxyl modified polycaprolactone adduct reaction product mixture of the reaction of (i) a polycaprolactone polyol and (ii) from 0.1 to 1 carboxylic acid anhydride equivalent for each hydroxyl equivalent present in the polycaprolactone polyol of an intramolecular anhydride of a polycarboxylic acid.

11. A composition as claimed in claim 10, wherein said aminoplast crosslinker is hexamethoxymethylmelamine and said adduct is the reaction product of a mixture of a polycaprolactone triol having an average molecular weight of 540 and an average hydroxyl number of 310 and a polycaprolactone triol having an average molecular weight of 300 an and average hydroxyl number of 560 reacted with 20 mole equivalent percent of phthalic anhydride.

12. A composition as claimed in claim 1, wherein Component II is a mixture of an aminoplast crosslinker and a low molecular weight polyol having a molecular weight of from 62 to 1,000 and from 2 to 6 hydroxyl groups.

13. A composition as claimed in claim 12, wherein said aminoplast crosslinker is hexamethoxymethylmelamine and said polyol is trimethylolpropane.

14. A composition as claimed in claim 1, wherein Component II is a mixture of an aqueous acrylic latex and an aminoplast crosslinker.

15. A composition as claimed in claim 14, wherein said crosslinker is hexamethoxymethylmelamine and said latex is a 43 percent solids latex of a styrene/ethyl acrylate/methacrylic acid/2-hydroxyethyl acrylate polymer.

* * * * *